United States Patent [19]

Stephan

[11] Patent Number: 5,488,864

[45] Date of Patent: Feb. 6, 1996

[54] TORSION BEAM ACCELEROMETER WITH SLOTTED TILT PLATE

[75] Inventor: Craig H. Stephan, Ann Arbor, Mich.

[73] Assignee: Ford Motor Company, Dearborn, Mich.

[21] Appl. No.: 358,299

[22] Filed: Dec. 19, 1994

[51] Int. Cl.⁶ .............................................. G01P 15/125
[52] U.S. Cl. .................................... 73/514.32; 73/514.36
[58] Field of Search ................................. 361/280, 283.1; 73/514.32, 514.36, 514.16, 514.21

[56] References Cited

U.S. PATENT DOCUMENTS

| | | | |
|---|---|---|---|
| 4,483,194 | 11/1984 | Rudolf | 73/514.32 |
| 4,598,585 | 7/1986 | Boxenhorn | 73/504.12 |
| 4,736,629 | 4/1988 | Cole | 73/514.36 |
| 5,220,835 | 6/1993 | Stephan | 73/514.32 |

*Primary Examiner*—Hezron E. Williams
*Assistant Examiner*—Christine K. Oda
*Attorney, Agent, or Firm*—Daniel M. Stock; Roger L. May

[57] ABSTRACT

A capacitive-type torsion beam accelerometer sensor element exhibiting improved stability contains slots in the heavy side of the rotatable sensing element which serve to alter the geometry of the heavy side capacitor such that the electrical geometry substantially coincides with the physical geometry of the substrate's fixed conductive plate in the presence of charge spreading. The slots also permit ingress and egress of air, thus extending the frequency response.

20 Claims, 3 Drawing Sheets

TORSION BEAM ACCELEROMETER WITH SLOTTED TILT PLATE

TECHNICAL FIELD

This invention pertains to micro-miniature, solid state capacitive sense elements for use in accelerometers. More particularly, the invention pertains to a capacitive sense element having improved response characteristics.

BACKGROUND ART

Transducers which translate non-electrical quantities into electrical signals are designed to provide a usable output in response to a particular physical quantity, property or condition which is desired to be measured. The term "sense element" has been used to define both the overall transducer as well as the transducer element which performs the first step in a multi-step translation process. For the purposes of the instant invention, the latter definition will govern.

Transducers with sense elements used to measure acceleration are known as accelerometers. Accelerometer applications in the automotive industry include incorporation into crash sensors for air bag deployment and ride motion sensors for active suspension components.

Recently, accelerometer sense elements have been fabricated in part from silicon by adaptation of conventional integrated circuit processing methods. For example, U.S. Pat. No. 4,483,194 discloses an acceleration sensitive element consisting of a flap suspended at two adjacent corners by means of an integrally processed torsion bar which maintains the flap, when at rest or at constant velocity, a fixed distance above a conductive electrode deposited on a planar glass substrate, forming a capacitor between the flap and the electrode. Upon acceleration normal to the plane of the device, the flap rotates about the torsion bar axis, changing the capacitance between the flap and the electrode. The change in capacitance may be compared to a standard capacitance in a bridge-type circuit. In either case, variation in temperature and changes in capacitance associated with aging of components render the device of U.S. Pat. No. 4,483,194 unsuitable for many exacting applications. Moreover, the change in capacitance is non-linear with respect to acceleration, and thus the output signal will not accurately track acceleration.

U.S. Pat. No. 4,736,629, hereby incorporated by reference, discloses an accelerometer employing a sense element which consists of a metallic upper plate having an internal opening surrounding a pedestal mounted to a semiconductor substrate. The pedestal is connected to the metallic plate by a pair of torsion members extending in opposite directions from the pedestal to the metallic plate. Fixed plates positioned on the semiconductor substrate correspond to portions of the metallic plate to form first and second capacitors. The position of the torsion arms and/or geometry of the metallic plates ensures that the portions of the plate on either side of the torsion bar axis have unequal moments. In response to acceleration normal to the substrate the metallic plate rotates around the flexure axis defined by the torsion members to vary the capacitance of the first and second capacitors.

Devices such as those disclosed in U.S. Pat. No. 4,736,629 represent an improvement over the devices of the '194 patent, as the capacitors on either side of the torsion bar axis are constructed of the same material and should thus be similarly affected by temperature, aging of components, and the like. Moreover, as the capacitance of one set of plates increases while the other decreases, sensitivity of the accelerometer is enhanced as opposed to comparing but a single capacitance to a standard, and the output has substantially improved linearity. The '629 device is not easily manufactured by semiconductor processing techniques, however, and being highly damped, is not sensitive to a wide range of accelerations.

U.S. Pat. No. 5,220,835 discloses a capacitance accelerometer sense element having a dielectric substrate and a semiconductive upper plate in which the torsion beams which define the flexure axis of the upper plate are themselves attached to an annular ring connected to a supporting pedestal by a pair of beams in the plane of the torsion beams but perpendicular to the axis of the torsion beams. This arrangement places the torsion beams under tension rather than compression when subject to thermal stress, reducing the potential of the torsion beams to deflect or buckle under such conditions, improving the linearity of the device as well as decreasing the chance of deflection where the upper plate comes in contact with the lower plate electrode, shorting the capacitor formed between the upper and lower plates.

In copending U.S. application Ser. No. 08/043,671 is disclosed a torsion bar accelerometer which improves notably on the performance of such devices. In the device disclosed in the '671 application and illustrated herein by FIG. 7, the upper plate of the accelerometer is a monolithic boron-doped silicon substrate having an internal opening in the upper plate adapted to contain a pedestal to which the plate is connected by torsion arms. The upper plate, torsion arms, and pedestal all are formed from the same silicon wafer by processes adapted from integrated circuit processing technology, and thus are economical to manufacture. To overcome the limitations with regard to wide frequency response, the upper plate contains numerous through-holes allowing a passage for air to escape or enter the area between the plates as they rotate about the torsion bar axis responsive to acceleration normal to the plane of the device. The '671 device therefore has a considerably enhanced range of response as compared to prior devices.

In the '629, '671, and '835 devices, however, symmetry in geometry of the two capacitors, needed to eliminate offsets and provide linear operation, is partially destroyed by the fact that the surface areas of the movable plates, or "tilt plates", which form the upper plates of the two capacitors are not identical. In operation, the charge induced on the electrodes on the planar substrate during operation may migrate to the area surrounding the electrodes. Even when the substrate is glass, normally considered an insulator, the limited conductance allows such charge spreading, particularly at elevated temperatures. The arm of the device of higher moment and thus larger plate area thus has an electrical geometry different from and larger than that of the opposite arm, even though the physical geometries of the conductive electrode surfaces may be identical. The difference in effective areas of the two capacitors increases nonlinearity of the response. In addition, charge spreading will increase the electrostatic attractive force between the upper and lower plates of the capacitor, tilting the plate and cause a drift in output. Moreover, the numerous through-holes in the semiconductive upper plate of the '671 device lowers the effective surface area of the plates. As the capacitance changes being measured are on the order of femtofarads, these defects are of considerable importance in accurately measuring acceleration.

It is thus an object of the present invention to provide an accelerometer sense element wherein the electrical geometries of the "heavy side" and "light side" capacitors are substantially similar.

It is a further object of the present invention to provide an accelerometer sense element having a wide frequency response without the necessity of providing numerous through-holes in the upper plate of a torsion beam accelerometer.

DISCLOSURE OF INVENTION

The present invention pertains to a capacitive-type torsion beam accelerometer sense element having a substantially planar substrate; a sensing member positioned above and parallel to the substrate and rotatable about a flexure axis, the portion of the sensing member on one side of the flexure axis being larger in area than the portion of the sensing member on the other side of the flexure axis; first and second conductive surfaces arrayed substantially symmetrically on the substrate about the flexure axis, the second conductive surface coacting with the larger side of the sensing member to define a heavy side deflection capacitor, the first conductive surface coacting with the other side of the sensing member to define a light side deflection capacitor; isolation means effective to limit the electrical geometry of the heavy side capacitor to substantially the physical geometry of the first conductive plate in at least one dimension; wherein the sensing member rotates about the flexure axis responsive to acceleration normal to the surface of the substrate, and wherein the capacitance of the heavy side and light side capacitors change in response to the rotation.

The subject accelerometer sense element further pertains to a sense element having a planar substrate; a planar sensing member having at least a first internal opening; mounting means positioned within the first internal opening for mounting the sensing member above the substrate, the mounting means comprising a pedestal having two opposed torsion arms defining a flexure axis about which the sensing member rotates responsive to acceleration normal to the plane of the substrate, the torsion arms fixed to the sensing member; light side and heavy side plates of conductive material integral with the sensing member, the heavy side plate larger in area than the light side plate; two pair of conductive plates defining heavy side and light side deflection capacitors, the heavy side deflection capacitor comprising the heavy side plate and a conductive surface on the substrate below the heavy side plate, the light side deflection capacitor comprising the light side plate and a conductive surface on the substrate below the light side plate, the light side and heavy side deflection capacitors arrayed substantially symmetrically on opposed sides of the flexure axis; first and second slots in the heavy side plate extending proximately from the internal opening and perpendicular to the flexure axis, the inner longitudinal sides of the slots corresponding substantially to outer longitudinal edges of the conductive surface on the substrate below the heavy side plate, the slots extending a substantial portion of the length of the conductive surface on the substrate in the direction perpendicular to the flexure axis.

In a preferred embodiment, the lower plate has on either side of the heavy side deflection capacitor self-test capacitor plates (electrodes) capable, through interaction with the portions of the heavy side plate immediately above the self-test capacitor plates, of providing a designed rotation of the upper plate about the flexure axis in response to a self-test voltage applied to the self-test electrodes. In some applications, such as for air bag deployment systems, the self-test voltage is selected such that a deflection similar to that which would be expected in a front end vehicle crash is obtained.

BEST MODE(S) FOR CARRYING OUT THE INVENTION

Figure 1:
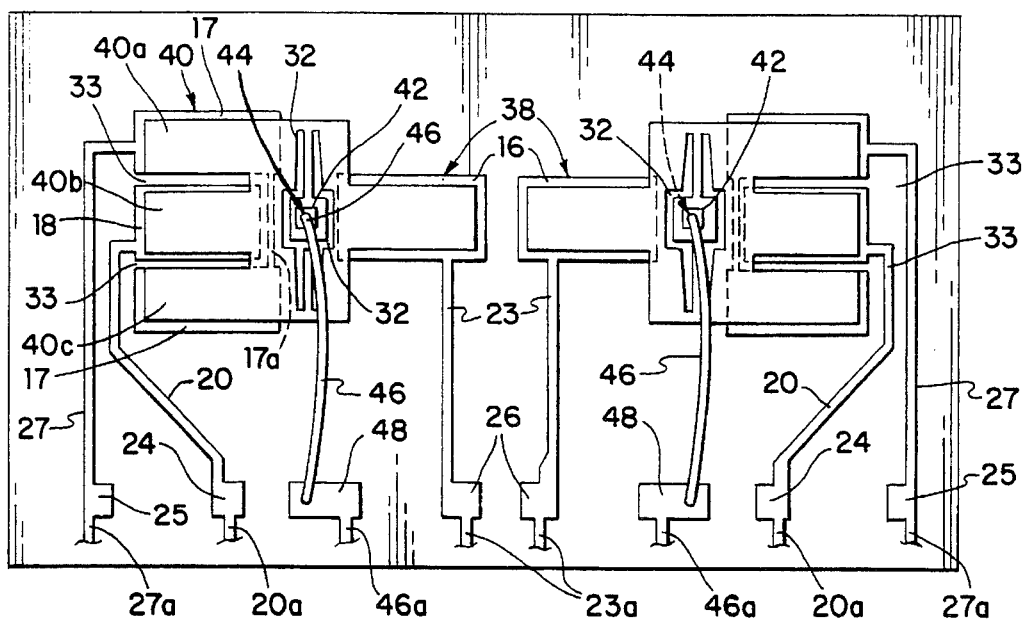
FIG. 1 shows a top view of the sense element portion of an accelerometer utilizing two sense elements.

Various other objects, features and attendant advantages of the present invention will be more fully appreciated as the same becomes better understood from the following detailed description when considered in connection with the accompanying drawings in which to-the extent possible, like reference characters designate like or corresponding parts throughout the several Figures. The drawings contained herein should not be construed to limit the invention as set forth in the appended claims.

The sense elements of the present invention are characterized by improved linearity of operation and improved reliability in terms of accurately measuring acceleration, particularly the acceleration which might be associated with the impact of a moving vehicle with an object. This improved operation is made possible by defining an upper plate geometry which renders the light side and heavy side upper plate capacitors substantially equivalent to each other in the electrical,sense. At the same time, the parallel slots positioned around the acceleration-sensitive portion of the heavy side upper plate provide a passage for air to enter or leave the area between the upper plate and the substrate, thus substantially improving the frequency response of the plate without decreasing the plate area. If additional passages for air movement to further reduce squeeze-film damping are desired, these may be added as in U.S. application Ser. No. 08/043,671, but the number of through-hole passages may be substantially reduced. The sense elements of the subject invention are responsive to accelerations in the range of 0.5 to 1000 g, have a measurement bandwidth of from 0–5000 Hertz, and a damping ratio of from 2 to 20.

FIG. 1 illustrates a fully differential acceleration transducer employing two oppositely configured accelerometer sense elements of the subject invention. In FIG. 1, bonding pad 44, preferably of aluminum, is formed at the top of the supporting pedestal 42, which can be more clearly seen in section from FIG. 3. Connecting wire 46 connects pad 44 to bond pad 48, located preferably on the surface 14 on dielectric substrate 10 (FIG. 2), and which is electrically connected by connector 46a to the integrated circuit which translates the changes of capacitance of the respective heavy and light side capacitors responsive to acceleration into an appropriate output signal. The lower, heavy side electrode 18 formed on the substrate is connected by trace 20 similarly to bond pad 24 and from there to the integrated circuit by wire 20a, while the lower, light side electrode 16 is similarly connected by trace 23 to bond pad 26 and from there by wire 23a to the integrated circuit. Self-test electrode conductive plates 17 on substrate surface 14 are interconnected by a conductive bridge 17a and are connected to the integrated circuitry by means of trace 27, bond pad 25, and connecting wire 27a. Heavy side upper plate 40 is that part of deflectable upper body 12 on the larger, heavy side of flexure axis 28 (refer to FIG. 2), and is divided by slots 33 into three portions 40a, 40b and 40c, with portion 40b defining with lower conductive plate 18 the heavy side deflection capacitor, and segments 40a and 40c defining with lower conductive plates 17, self-test capacitors. Upper light side plate 38 is that part of deflectable upper body 12 on the smaller, light side of flexure axis 28, which with lower conductive plate 16, define the light side deflection capacitor.

Figure 2:
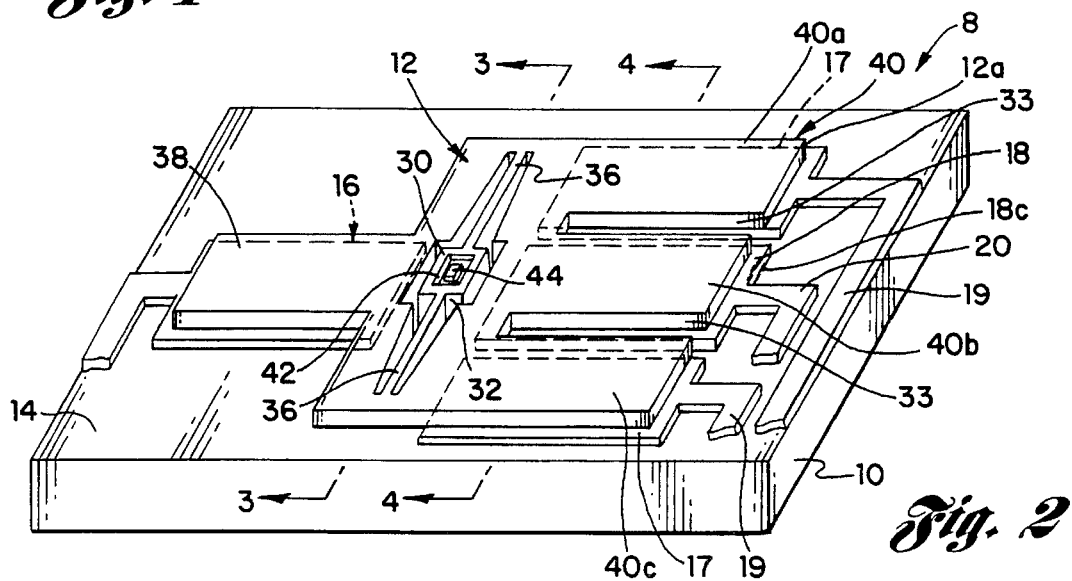
FIG. 2 provides a perspective view of one embodiment of a sense element of the instant invention.

Turning to FIG. 2, it will be seen that sense element 8 is a capacitive sense element comprising substantially planar substrate 10 and deflectable upper body sensing element 12 which is positioned above and parallel to the substrate 10.

Substrate 10 is a solid dielectric material such as glass, ceramic, nitride or plastic. Most preferably, substrate 10 will be glass and will have a coefficient of thermal expansion very near that of silicon. A suitable glass for use as substrate 10 is Corning Code #7740 which is available from Dow Corning, located in Corning, N.Y., U.S.A. Substrate 10 will preferably have a thickness from 0.2 to 1.5 millimeters and most preferably from 0.5 to 0.8 millimeters.

Fixed conductive plates 16 and 18 are mounted on the substantially planar upper surface 14 of substrate 10 and may be seen in phantom in FIG. 2. Fixed conductive plates 16 and 18 are comprised of metal, are preferably equal to one another in size and shape, and are preferably positioned symmetrically with respect to flexure axis 28. Fixed conductive plates 16 and 18 form the lower plates of the light side and heavy side capacitors, respectively. As will be discussed in greater detail below, upper plates 38 and 40b are those respective portions of deflectable upper body 12 which correspond to fixed plates 16 and 18 to form the light side and heavy side capacitors.

Fixed conductive plates 17 straddle the heavy side fixed conductive plate 18 and form the lower plate of the self-test capacitors, those portions 40a and 40c of the heavy side plate 40 forming the corresponding upper plate. In use, a self-test voltage applied between the self-test fixed conductive plates 17 and the movable plate 40 will cause the latter to deflect as there is no corresponding self-test capacitor on the side of the device opposite the flexure axis. The deflection caused by a given voltage difference applied between the self-test fixed plates 17 and the movable plate 40 can be measured by the deflection capacitors formed between elements 18 and 40b and elements 16 and 38, thus verifying operational status of the device. The self-test voltage is generally applied and the deflection measured upon power-up of the vehicle electrical system.

While a variety of metals are suitable for the formation of fixed plates 16, 17, and 18, a combination of metals will be preferably used. A suitable combination is chromium underlying platinum wherein chromium will have a thickness from 50 to 1000 Å and platinum will have a thickness from 50 to 3000 Å. Preferably, the chromium layer will be 150–300 Å thick and the platinum layer 500–1500 Å thick. Most preferably the chromium layer will 200 Å thick and the platinum layer 1000 Å thick. Those skilled in the art will appreciate that the total metal film thicknesses will range from between 100 Å to approximately 4000 Å.

Also lying on the substrate surface 14 are conductors 19, 20 and 23, which connect fixed plates 17, 18, and 16, respectively, to the rest of the transducer or accelerometer. While these electrical connections are also formed of metal, it is most preferred that they be of aluminum. Turning briefly to FIG. 1, it can be seen that conductors 20 and 23 are analogous to conductors 20 and 23 in FIG. 2. FIG. 1 also illustrates that the various conductors connect to respective bond pads from which conductors ultimately connect the sense element 8 to the integrated circuitry which comprises the remainder of the accelerometer or transducer. In FIG. 1, the self-test electrodes are internally connected, thus requiring one less connective wire and bond pad as compared to the embodiment of FIG. 2. Note that the various bond wires, bond pads etc. have been omitted from FIG. 2 to better illustrate other aspects of the claimed invention.

Returning to FIG. 2, deflectable body 12 is substantially planar and is positioned above upper surface 14 of substrate 10 so as to be parallel to upper surface 14 in the absence of both gravitational and acceleration forces normal to surface 14. Deflectable upper body 12 is comprised of pedestal 30 which is surrounded by internal opening 32 and connected to sensing element main body 12 by torsion arms 36. The deflectable portion of main body 12 is substantially planar as discussed above and comprises upper plates 38 and 40 which are respectively positioned above fixed conductive plates 16 and 18 to form a first deflection capacitor and a second deflection capacitor. Deflectable upper body 12 will have a length from 0.1 to 10 millimeters and a width of approximately 0.05 to 5.0 millimeters. Most preferably, deflectable body 12 will have a length of approximately 1 millimeter and a width of approximately 0.5 millimeters.

Deflectable upper body 12 will preferably have a shape such that upper plate 38 will have a total moment (i.e. mass times moment arm) about flexure axis 28 which is substantially less than the total moment of upper plate 40. Thus, it will be appreciated that in response to acceleration normal to upper surface 14, deflectable body 12 will rotate about flexure axis 28, the degree of rotation or deflection being approximately proportional to the magnitude of the acceleration, and the direction of rotation or deflection corresponding to the direction of the acceleration.

The deflectable upper body preferably contains conductive heavy side and light side plates integral with the upper body. By "integral" is meant that the two plates in question form a unitary whole. Thus, if the upper body is glass, for example, the conductive plates may be metallized portions firmly adhered to the glass surface. If the upper body is semiconductive, the conductive plates may be coextensive with the size of the upper body, being indistinguishable from it, or may comprise yet more highly conductive regions prepared by increased diffusion of dopants into the plate area, by metallizing, etc. Above all, it is highly preferred that whatever the fundamental material of construction of the upper body, whether single crystal silicon, glass, or, in less demanding applications, metal, that both heavy side and light side plates be formed at the same time from a single wafer or piece of construction material.

Torsion arms 36 are positioned within internal opening 32 to connect pedestal 30 to main deflectable upper body 12. Torsion arms 36 form the flexure axis 28. In response to acceleration normal to upper surface 14, upper plates 38 and 40 will deflect or rotate about flexure axis 28 to produce a difference between the capacitances of the first deflection and second deflection capacitors respectively formed by fixed conductive plate 16 and upper plate 38 and fixed conductive plate 18 and upper plate 40b. Slots 33 extend proximately from the internal opening surrounding the flexure axis 28 and perpendicular thereto to the outermost edge 12a of the deflectable upper body 12.

Figure 3:
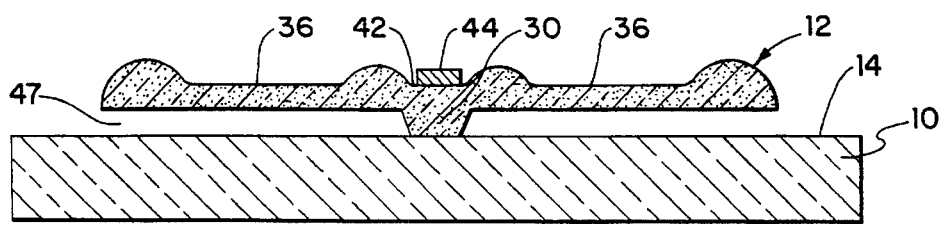
FIG. 3 illustrates a cross-sectional view of the sense element of FIG. 2 taken along the line 3—3.

Turning briefly to FIG. 3, it can be seen that pedestal 30 is attached to upper surface 14 of substrate 10, and is set above substrate 10 by the depth of the pedestal below upper body 12, thus providing gap 47 between the substrate and upper body. It is preferable that upper body 12 be of semiconductive material, and that the pedestal 30 and torsion arms 36 be formed integral with body 12 by conventional semiconductor processing techniques. However, in principle, upper body 12 may be made of alternative materials, for example metal, or glass on which conductive surfaces are applied, and the pedestal and torsion arms separately manufactured and bonded as appropriate to the upper body and substrate. Upper body 12 together with pedestal 30 and torsion arms 36 may be fabricated from boron-doped single crystal silicon. As will be discussed below, most preferably, pedestal 30 will be anodically bonded to substrate 10. Set within recess 42 of pedestal 30 is metal bond pad 44. Bond pad 44 most preferably will be of aluminum. Turning to FIG. 1, it can be seen that bond wire 46 connects bond pad 44 to bond pad 48. Conductor 48a leads to the integrated circuitry discussed above.

Figure 4:
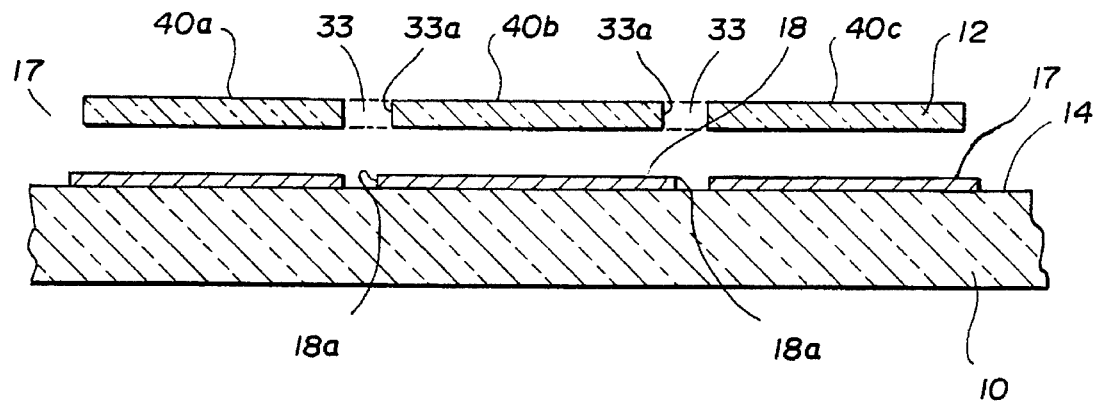
FIG. 4 illustrates a cross-sectional view of the sense element of FIG. 2 taken along line 4—4.

Turning now to FIG. 4, deflectable upper body sensing element 12 is shown in section 4—4 from FIG. 2. Portions 40a and 40c of upper body 12, with conductive lower plates 17 on upper surface 14 of substrate 10 define self-test capacitors which cause body 12 to deflect towards substrate 10 upon application of a self test voltage between upper body 12 and plates 17. Portion 40b of deflectable upper body 12, with conductive lower plate 18 define the heavy side deflection capacitor. Slots 33 extend proximately from flexure axis 28 (FIG. 2) to the outermost heavy side edge 12a (FIG. 2) of upper body 12. The innermost longitudinal edges 33a of slots 33 coincide proximately with the outermost longitudinal edges 18a of conductive plate 18. Preferably, the width of conductive plates 16 and 18 will be slightly larger than the width of the corresponding upper plates 40b and 38, and thus innermost longitudinal edges 33a will preferably be just inside of the outermost longitudinal edges 18a of conductive plate 18. The preceding defines the term "corresponding substantially to outer longitudinal edges" of the conductive plate on the substrate.

Figure 5:
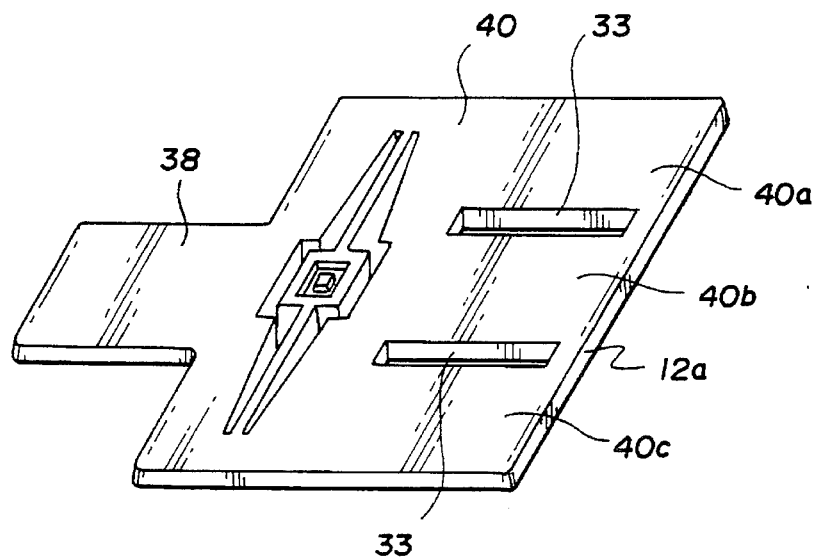
FIG. 5 illustrates an alternative embodiment of a deflectable upper body of a sense element of the present invention.

FIG. 5 illustrates an alternative embodiment in which slots 33 in deflectable upper body 12 do not extend completely to outermost edge 12a. Portions 40a and 40c of upper body 12 form the upper portions of the self test electrodes as illustrated earlier in FIG. 2. Portions 40b and 38 of upper body 12 form the upper portions of the heavy and light side deflection capacitors, respectively. The pedestal, bonding pad, internal opening and torsion arms have been previously identified.

Acceleration normal to the plane of the substrate 10 of the subject invention accelerometer sense elements will cause movable plate 12 to rotate about the flexure axis due to the fact that the heavy side of movable plate 12 has a higher moment than the light side. This rotation causes the capacitance of the heavy side to change in one direction while that of the light side changes in an opposite direction. For example, if the heavy side 40 of the movable plate 12 rotates closer to the substrate, the capacitance between the heavy side and fixed conductive plate 18 will increase, while the capacitance between the light side 38 and fixed conductive plate 16 will decrease. The difference in capacitance, divided by the sum of the capacitance, will be substantially linear with respect to acceleration, and can be converted by standard circuitry to an analog or digital signal which is proportional to acceleration.

The linearity and particularly the drift-free response of the device is dependent upon the total symmetry of the light and heavy side deflection capacitors, and the maintenance of this symmetry over time. On the light side, the upper plate 38 is substantially the same size and geometry as lower fixed conductive plate 16. If the heavy side upper plate 40 and lower fixed conductive plate 18 were identical to the corresponding elements (38 and 16) on the opposite side of the flexure axis, total symmetry would be attained. However, because the heavy side must have a greater mass than the light side so as to deflect in response to acceleration, and due to the desirability of having self-test capacitors formed between the upper movable plate 40 (portions 40a and 40c) on the one hand, and fixed conductive plates 17 on the other, while fixed conductive plates 16 and 18 may be identical in size, respective location, and shape, the heavy side upper plate 40 is much larger than the light side upper plate 38.

If the dielectric substrate were a perfect insulator, the electrical symmetry of the device would be maintained due to the geometrically similar heavy and light side capacitors and their symmetrical arrangement about the flexure axis. However, the relatively small conductivity of the substrate allows the charge applied to fixed conductive plates 16 and 18 to spread beyond the boundary of the respective conductive surfaces. Consider first what occurs in devices of the geometries shown in FIGS. 6 or 7. The presence of the larger conductive plate 40 above the smaller electrode 18 beneath it creates electric fields that cause the charge to spread beyond the edges of the smaller electrode, as shown in shadow at 18b. By inducing image charges in the upper plate, this charge creates an attractive force between the two electrodes, causing the upper body 12 to tilt, increasing the capacitance of the heavy side and decreasing the capacitance of the light side. This results in a drift in output of the accelerometer. The effect can be nullified only if charge spreading from the light side bottom electrode occurs in exactly the right way so as to create an equal and opposite counterbalancing force. However, this effect cannot be controlled.

The effect can be substantially eliminated by the geometry of FIGS. 1–5. With this device, the electrodes 16 and 18 are made slightly wider and longer than the plates 38 and 40b, respectively, above them. A preferred width is such as to position the longitudinal edges 18a of the bottom electrode 18 half way into the gaps formed by slots 33, and to have the outer lateral edge 18c of the bottom electrode extend a similar distance past the outer edge of plate 40b. The electrode 16 under the light side should have the same dimensions. By use of this approach, the effect of charge-spreading is reduced in two ways. First, since the upper electrode is smaller than the lower, the electric fields created tend to inhibit charge spreading. Second, even if charge spreading does occur, it does so outside the area of the upper electrode, and so no attractive force is created. Thus, the effect of charge spreading on three of the four edges of the electrodes is eliminated. Although charge spreading can occur inward toward the pedestal, the effect is minimized since the moment arm of an unbalanced force acting at the inner edges of the electrodes is very small, and the aspect ratio of the rectangular electrodes can be adjusted to make the lateral edges short.

In the present invention, electrical symmetry is substantially restored by an isolation means effective to limit the electrical geometry of the heavy side deflection capacitor to substantially the physical geometry of the conductive plate 18 located immediately below on the substrate over at least one dimension. By at least one "dimension" is meant that the geometry is limited along at least one side and preferably opposed sides of the capacitor geometry in a direction substantially perpendicular to the flexure axis. It is preferred that the electrode forming the lower, "heavy side" fixed conductive plate 18 on the substrate have a rectilinear shape, with longitudinal sides perpendicular to the flexure axis and lateral sides parallel to this axis. However, in principle, plates of other shapes such as trapezoidal, circular, elliptical, or other shapes may be used as well. In such case, "dimension" is interpreted as defining a slot or other isolation means generally following the outer longitudinal contour of the electrode away from the flexure axis, so as to isolate a substantial portion of the periphery of such non-rectilinear shapes from the remainder of the heavy side plate.

While the preferred isolation means has a continuous slot and preferably two parallel slots extending proximately from the interior opening of the upper body surrounding the pedestal to or near the outermost edge of the device, it would not depart from the spirit of the invention to interrupt this slot minimally along its length. Furthermore, if the upper body is a non-conductive material, effective isolation of the deflection plate area may be achieved through the use of a surrounding trace of conductive material maintained at the lower plate potential. The semiconductive upper body may have channels of silicon dioxide interrupting the upper plate by two parallel diffusion channels which extend perpendicular to the flexure axis. The silicon dioxide channel may be formed by a further masking and diffusion step. The slots 33, as utilized in the preferred embodiment, on their innermost edges 33a (FIG. 4), create between them a heavy side plate section 40b of geometry similar to that of the upper light side plate 38. The width of the slots between the area of the upper plate 40 above the lower fixed conductive plate 18 (forming the heavy side deflection capacitor) and the remaining portions of the upper plate, which, in the preferred embodiment, are those portions 40a and 40b above the self-test fixed conductive plates 17, is on the order of 0.02 to 0.1 mm, preferably 0.04 to 0.08 mm.

The "viscous" air previously trapped between the upper plates 38 and 40 and surface 14 can now flow upward through the slots, and optional through-holes when present. As a result, the overall damping ratio of the sense element is decreased and the speed of the sensor response increased. A plurality of through-holes may be used in addition to slots to achieve a particular set of desired response characteristics. To provide as much capacitance as possible in a small area, the gap 47 between deflectable body 12 and upper surface 14 is made very small relative to the dimensions of upper plates 38 and 40. Indeed, gap 47 will be approximately 1 to 10 microns, preferably from 5–7 microns. As a result, substantial damping effects result from the tendency of the air to resist displacement when "squeezed" between surface 14 and upper plates 38 and 40.

Figure 6:
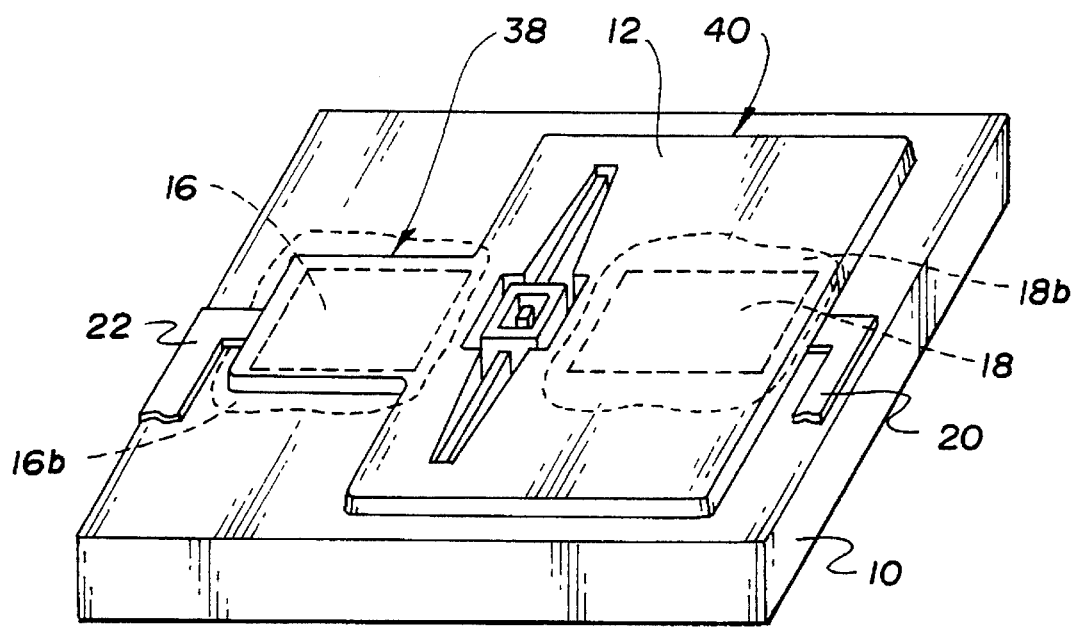
FIG. 6 illustrates an embodiment not of the subject invention where the frequency range of the sense element is limited by air trapped between the upper plate and substrate.

The sense element illustrated in FIG. 6 has a damping ratio which produces a measurement bandwidth which is narrow. The damping is, in fact, so high, that the natural resonant frequency of the device is difficult to ascertain, as the high damping will not allow any substantial oscillation. Such "response" characteristics are undesirable because the sensor response is too slow and is not responsive to the desired frequency components of an acceleration signal. This is particularly true with respect to sense elements for accelerometers intended for use in automotive crash sensors for air bag deployment.

As the sense element shown in FIG. 6 contains gas in the gap 47 (refer to FIG. 3) between deflectable upper body 12 and substrate 10, deflection of the upper body about the flexure axis will be resisted by the gas, preferably dry nitrogen, located in the gap. Deflection will cause compression or rarification, and gas will be forced to enter or leave the gap. This "squeeze-film effect" will cause high damping and therefore a low frequency range.

Figure 7:
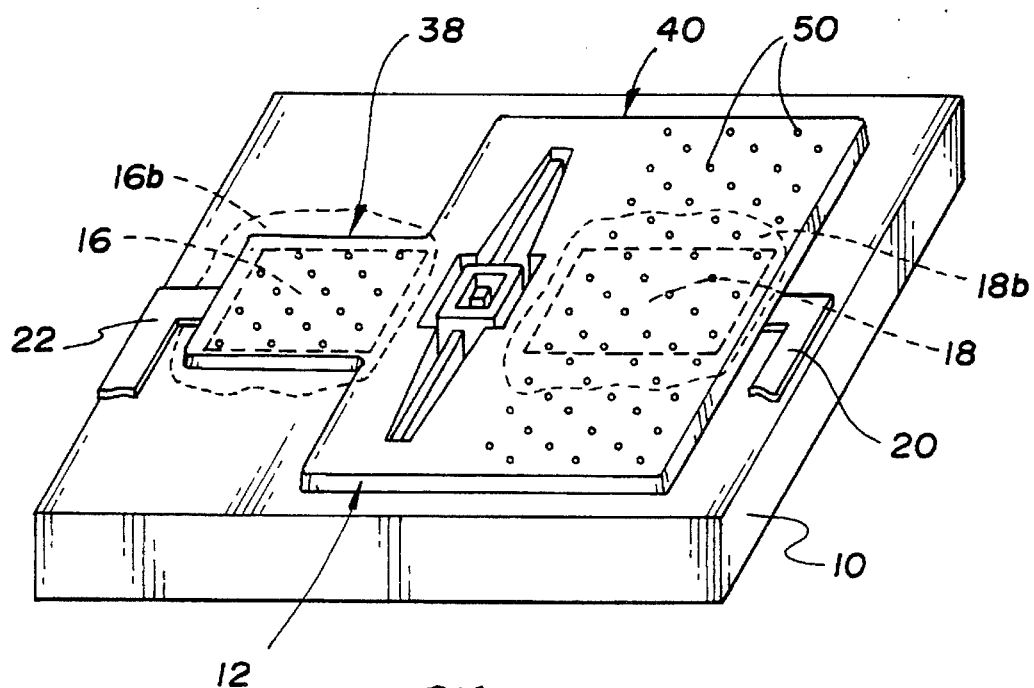
FIG. 7 illustrates a perspective of the sense element of one embodiment of copending U.S. application Ser. No. 08/043, 671.

In FIG. 7, the same numerals are used as in FIG. 6. However, in FIG. 7 the frequency range and response time are improved by incorporation of numerous through holes 50 in portions of upper plate portions 38 and 40. However, charge spreading, shown at 16b and 18b, still affects the electrical geometry creating differences in capacitance between the light and heavy side deflection capacitors and a drift in output over time. Moreover, the relatively large number of holes located in the electrically active portions of the upper plates, i.e. those portions immediately above capacitance plates 16 and 18, causes a decrease in capacitance of both plates and therefore lower sensitivity.

As indicated previously, deflectable upper body 12 of the subject invention sense element is preferably comprised of boron doped silicon. The use of boron doped silicon substantially eliminates the problems of hysteresis and creep to increase the overall accuracy and reliability of sense element 8. The density of the boron doped silicon used herein provides a sense element wherein upper plates 38 and 40 (FIG. 2) have sufficient mass and moment arm such that the sensitivity of sense element 8 can be controlled and a desirable level of sensitivity achieved. The silicon of preferred deflectable body 12 will preferably have a boron concentration of $1 \times 10^{19}$ cm$^{-3}$ or greater. The boron concentration should be symmetric with respect to the plane of the deflectable body 12. While there may be some change in boron concentration over the thickness of deflectable body 12, the boron concentration should preferably not be less than $1 \times 10^{19}$ cm$^{-3}$. The higher the differential mass of upper plates 38 and 40 the greater the sensitivity of sense element 8.

The use of boron doped silicon to form deflectable body 12 not only provides the performance advantages of the metallic upper plate disclosed in the '629 patent, but also eliminates problems such as hysteresis and creep as well as non-desirable plastic deformation resulting from high stress conditions and mechanical forces. Hysteresis is eliminated because a single-crystal silicon wafer with no grain boundaries is utilized for the formation of the preferable boron doped silicon deflectable body 12. The unique property of silicon to exhibit no plastic deformation until catastrophic failure is responsible for the elimination of creep.

The use of the boron doped silicon and the preferable glass dielectric substrate substantially reduces stresses caused by the use of materials with significantly different coefficients of thermal expansion. The single crystal structure of the boron doped silicon has the further advantage of being non-magnetic and more chemically stable and inert as compared to metals and polycrystalline materials. It is also more mechanically stable than such materials.

The presence of a large number of through-holes, while increasing the bandwidth of the accelerometer sense element, has the effect of decreasing the capacitance. The elongate slots or channels present in the heavy side upper plate 40 of the subject invention sense elements allow for the movement of air into or from the area between the upper plate 40 and the substrate 10, thus considerably extending the bandwidth of the device in addition to improving its electrical symmetry. If greater bandwidth is desired, through-holes may additionally be employed. If these through-holes are located only on the portions of the heavy side plate 40*a* and 40*c* which lie above the self-test fixed conductive plates 17, then the capacitance of the deflection electrodes will not be compromised whatsoever. However, such through-holes may also be employed in the heavy side plate 40*b* in the area above fixed conductive plate 18 with some loss of total capacitance. In such a case, it is desirable to locate through-holes on light side upper plate 38 as well, to ensure electrical symmetry.

If through-holes are to be employed, it should be noted that a greater number of holes having relatively small diameters from 0.1 to 50 μm is much preferred compared to fewer holes of greater diameter, as the reduction in damping is greater in the former case.

As a result of the unique design of the torsion beam accelerometer sense elements of the present invention, the sense elements will be responsive to their resonance frequency of about 1–5 KHz in the working atmosphere discussed below.

Another significant advantage of the preferred sense elements of the subject invention, is that the moderate damping ratio so achieved produces a sense element with increased sheck survivability. When the sense element is dropped, no damage should occur to deflectable upper body 12. This effect is supplemented by the substantial resistance of the boron-doped silicon to suffer plastic deformation caused by mechanical stress. It is anticipated that the sense element disclosed herein will survive not only the rigors of use, but also the traditional hazards associated with the manufacturing of the sense element and the subsequent processing required for its final incorporation into an accelerometer used in a crash sensor, automobile, airplane, etc. It is intended that the disclosed structure and composition result in a sense element 8 which suffers no loss of sensitivity from mechanical shocks and will maintain its original state without deformation or damage which would reduce the sensitivity and/or accuracy of the device. Ideally, in the event of a shock of sufficient magnitude the sense element will break so as to be non-functional rather than function and thus provide inaccurate signals while deformed or bent.

In a preferred embodiment of the subject invention, the fixed conductive plate 18 which forms the lower plate of the heavy side deflection capacitor is flanked by two additional fixed conductive plates 17. Unlike the deflection capacitors which are symmetrically arrayed on either side of the flexure axis, a voltage applied between the upper movable plate 12 and the self-test fixed conductive plates 17 will cause the heavy side plate to deflect towards the substrate. This deflection can be measured by the change in capacitance of the deflection capacitors. A broken upper movable plate, torsion beam, or substrate, or the presence of dirt or other obstacle to the free rotation of the movable plate can thus be detected.

The self-test conductive plates 17 may be separately connected to the self-test circuitry, or may be deposited as shown in FIG. 1 to have a common internal connection, thus minimizing the number of bond pads and connective wires. When not being utilized in a self-test mode, the potential of the self-test electrodes may be maintained at the potential of the upper body sensing element 12.

The slots which form the lateral boundaries of the heavy side plate deflection capacitor do not extend to the internal opening 32 of the upper plate 12 as otherwise the sides of the heavy side plate would not be supported. They may, however, extend proximately from the internal opening of the upper plate 12, in other words, having as their starting point, a point which is substantially coincident with the most interior, lateral border of the lower plate 18 to the outermost edge 12*a* of the upper heavy side plate 40. The thickness and strength of the semiconductive material of which the upper plate is composed is such that the structural integrity of the upper plate as a whole is generally not compromised unduly by the presence of the slots. However, any such weakening effect may be compensated by not extending the slots to the outermost end of the heavy side plate, but terminating the slot before the end of the plate, thus strengthening the assembly. While this arrangement is not as ideal from the standpoint of electrical symmetry, its effect is minimal. Such an embodiment is presented in FIG. 5.

As previously mentioned, a significant advantage of the claimed sense element over prior art sense elements is the efficient and cost effective manufacturing process used to make it. This method of making itself contributes to a sense element with increased strength and higher reliability than prior art sense elements. The method of manufacturing the claim sense element will now be discussed. Also, the dimensions of certain aspects of the drawings have been exaggerated for the purposes of clarity. Thus, the aspect ratios of the device are not intended to be illustrated therein.

The accelerometer sense element may be manufactured using conventional semiconductor processing techniques. In general, the starting point is a single-crystal silicon wafer having a 100 crystal orientation and polished on a single side. The wafer is initially from 0.3 mm to 0.7 mm thick, preferably 0.4–0.5 mm thick with a diameter of 75 mm to 200 mm or greater. Numerous devices are fabricated at the same time from this wafer.

The wafer is first oxidized to $SiO_2$ which is selectively removed at all locations but those where the upper plate pedestal is desired. A bulk etch, for example in KOH/NaOH solution will then remove from 0.5–10 μm of silicon, preferably 5.0 μm, corresponding to the desired pedestal height, and thus the spacing 47 between the movable plate 12 and the surface 14 of substrate 10. A preferred etchant solution employs 3.0 Kg KOH and 0.316 Kg NaOH in 6 liters of deionized water, the etching process requiring from 5 to 30 minutes, preferably 10 to 20 minutes at 60°–90° C., most preferably 15 to 17 minutes at 60° C.

The result is a wafer having numerous raised "islands" of silicon, each topped with a layer of $SiO_2$. Each of these "islands" represents a pedestal of a sense device. The $SiO_2$ layer is then removed using concentrated hydrofluoric acid, and a diffusion mask of silicon nitride deposited. Silicon nitride is removed by plasma etch in all but those areas where a subsequent boron diffusion is not desired, i.e., those portions of the wafer which are outside the boundaries of the sense element or the areas where holes or slots are to be later formed. Boron is then diffused into the wafer, a first diffusion step essentially saturating the surface, while a second diffusion distributes the boron into the thickness of the wafer.

The initial diffusion may comprise 6 hours at 1150° C. using a boron source such as "Boron-Plus" available from Owens-Illinois of Toledo, Ohio. The second diffusion occurs from 0.5 to about 10 hours at 900°–1200° C., preferably about 3.5 hours at 1000° C. The amount of boron and the length of diffusion is selected so as to provide a boron concentration in the finished sense element of at least $1 \times 10^{19}$ $cm^{-3}$.

Careful control of the mask used to define the thickness and geometry of the torsion beams is necessary, since the torsional rigidity of these arms is approximately inversely proportional to the cube of their thickness. In general, the width of the mask opening defining the boron infusion in the portion of the wafer to be designated as a torsion arm should always be less than the boron diffusion depth in the areas of bulk diffusion.

Following boron diffusion, the top (boron diffused) surface of the silicon wafer is anodically bonded to the glass substrate 10. Although those skilled in the art will be familiar with anodic bonding processes, the article, "*Mechanisms of Anodic Bonding of Silicon to Pyrex™ Glass*" by K. Albaugh et al., 1988 IEEE SOLID-STATE SENSOR AND ACTUATOR WORKSHOP PROCEEDING, 88TH0215-4, pages 109–110 may be referred to in this respect. Only the tops of the pedestals and other raised areas left after the NaOH etch make contact with the glass and are bonded to it.

After anodic bonding, the composite wafer is bulk etched to remove the substantial remainder of the silicon wafer, leaving behind a heavily boron-doped silicon structure having a pedestal, a central opening surrounding the pedestal, and two opposed torsion beams connecting the pedestal to the movable plate. The larger, or heavy side plate, of the structure will have two slots extending proximately from the central opening to the outermost edge of the heavy side plate or terminating just short of the outermost edge of the heavy side plate.

The bulk etching is achieved with the use of an isotropic or anisotropic etchant solution. A suitable etchant will remove the majority of remaining undesired bulk silicon wafer. A suitable etchant solution will be a KOH solution comprising three kilograms of KOH in seven liters of deionized water. The wafer remains in contact with the etchant solution for a period of 1.0 to 5.0 hours at a temperature from 70°–100° C. and most preferably 2.5 hours at 90° C. for a wafer having an initial thickness of 0.4–0.5 mm. The bulk etch is followed by a selective etch in a solution comprised of three kilograms of KOH in seven liters deionized water saturated with isopropyl alcohol. This solution contacts the remaining wafer until such time as the wafer 52 is clear, i.e. until the glass substrate 60 is visible, followed by an additional 0.5 to 2.0 hours contact with the solution, most preferably 0.75 hours.

After the final etching of silicon from the boron doped deflectable upper body 12, conventional photolithographic techniques are used to pattern the desired metal bonding pads and conductors discussed above. Note that prior to the anodic bonding, conventional photolithographic and deposition techniques are used to deposit chromium and platinum on the glass substrate to form fixed conductive plates 16 and 18, and optional self test electrodes 17.

While the process thus far described is suitable for preparing the accelerometer sense elements of the subject invention, they are preferably prepared in opposed matched pairs as illustrated by FIG. 1, in a single epitaxial process. Techniques for the epitaxial processing of semiconductor devices are well known. By preparing two of such devices at the same time and from the same silicon wafer, a fully differential accelerometer sensor is achieved wherein each of the individual sense elements is matched with respect to such variables as bulk resistivity, dopant implantation depth, thickness, pedestal height, geometry, etc.

In the preferred epitaxial process, a wafer of single crystal silicon polished on one surface, having a 100 orientation and a resistivity of 5 Ω-cm is used as the starting substrate. The semiconductive tilt plate and pedestal with torsion arms will be manufactured from this plate, with the pedestal side of the device protruding from the surface. The device itself will be wholly epitaxial, i.e., the silicon wafer starting material will be later etched away in its entirety.

The polished surface of the single crystal wafer is first implanted with boron at a concentration of $10^{16}$ $cm^{-3}$ over a depth of approximately 1.3 µm to act as an etch stop as the remainder of the silicon wafer is etched away in a later step. The boron implantation is a conventional ion implantation process, with a boron source as described previously, supplying positively charged boron ions which are accelerated toward the grounded wafer by a high potential on the order of $1.5 \times 10^5$ volts. Following boron implantation, a 12 µm layer of epitaxial silicon is grown by standard techniques, for example by subjecting the wafer to a stream of hydrogen and dichlorosilane containing a phosphorous source such that the epitaxial silicon layer will contain $10^{16}$ $cm^{-3}$ of phosphorus as a dopant to increase conductivity. Phosphine is advantageously used as the phosphorus source.

The phosphorus doped epitaxial silicon layer is then coated with 1000–2000 Å silicon nitride. The wafers are mounted in a Quartz carrier and placed in a furnace at 800° C. and 300 mTorr while a mixture of silane and ammonia are passed through the furnace. The silicon nitride coated wafer is then coated with a photoresist to a depth of from 0.5 to 2 µm, and exposed to UV light through a patterned photomask.

The photomask will contain opaque areas which correspond to the portions of the epitaxial layer which are to represent raised portions projecting from the bottom of the tilt plate. These portions include the pedestal and raised projections or "bumps" which serve to limit the approach of the tilt plate to the substrate upon severe acceleration.

Following exposure, the photoresist is developed, portions not having been UV exposed being washed away, exposing the silicon nitride layer in these areas. The exposed silicon nitride is then plasma-etched at 13.4 MHz, following which the cured portion of photoresist is removed. The wafer, at this point, consists of the single crystal wafer, the boron etch resist layer, the epitaxial silicon layer, and a pattern of silicon nitride which corresponds to the photomask pattern, i.e. with silicon nitride present on portions which are to be raised areas of the device.

The wafer is then etched in 30% by weight KOH in deionized water/isopropanol at 60° C. to achieve an etch depth of approximately 6 µm. The areas below the silicon nitride pedestal mask remain at the original epitaxial layer height, i.e. about 6 µm above the depth of etch. The portions of the layer which form the "bumps", due to the limited area of photoresist above them, are etched both downwards and slowly sideways, to an intermediate depth of about 5 µm, thus leaving 1 µm projections above the bottom plane of the device.

Next, the wafer is processed to prepared the slots, through-holes if any, the spaces surrounding the torsion arm, and the shape of the sense element itself. A silicon nitride layer is added as before, followed by a photoresist layer, exposure to UV light, and removal of silicon nitride by plasma etch in the areas to be chemically etched. Following removal of the remaining photoresist, the wafer is etched in 30% by weight $H_2O$/isopropanol at 73° C. down to the boron etch stop. At the end of this step, the sense element will appear as a raised portion above the silicon wafer, with the slots, the spaces surrounding the torsion beam, through-holes if any, and the area outside the periphery of the device etched to the depth of the boron etch resist.

The wafers are then stacked adjacent to boron nitride wafers and placed in a furnace at 1000° C. in a flow of oxygen and nitrogen, resulting in corner rounding diffusion and shallow boron diffusion. The wafer is now suitable for anodic bonding to the glass substrate, which must now be prepared.

The glass substrate is prepared by application of photoresist on the glass followed by exposure with a photoresist mask corresponding to the negative of the electrode, trace, and bonding pad patterns. After dissolving the unexposed photoresist, the entire surface is coated with 200 Å of chromium and 1000 Å of platinum by electron beam evaporation of the appropriate hot metal target. The portions of cured photoresist remaining, now also coated with Cr/Pt in addition to the glass surface, are removed by high pressure water jet lift-off, leaving a metal patterned substrate.

The complementary semiconductive sense elements, now existing as raised portions of epitaxial silicon on a portion of the original wafer, are anodically bonded at the base of the pedestal to the glass surface. The anodic bonding process takes place at a temperature of 400°–420° C.

Following anodic bonding, the bulk of the silicon wafer is removed by etching in 30% by weight KOH in deionized water at 95° C., leaving a depth of the original wafer of approximately 20 μm after about 2 hours. The remainder of the wafer is removed by a 30% by weight KOH deionized water/isopropanol etch, following which the boron etch resist layer is removed in 1:3:8 HF:HNO$_3$:acetic acid over a time of approximately 1 minute. This solution removes all heavily (>10$^{19}$) doped areas of the device, resulting in rounding off of any abrupt corners and increasing mechanical strength as a result.

Finally, the aluminum bond pad is deposited on the surface of the bonding pads as well as the top of the pedestal.

Although the manufacture of the claimed sense element 8 has been disclosed, it will be appreciated by those skilled in the art that the claimed sense element will subsequently be incorporated into an accelerometer. It is most preferred that the final atmosphere in which the sense element is contained be comprised of at least 95% N$_2$ or other inert gas and be substantially free of water vapor.

Turning to FIG. 1, those skilled in the art will appreciate that two of the sense elements of the instant invention can be utilized to provide a fully differential accelerometer sense element. Such a construction allows for the various relative comparisons of the four capacitors. The sense elements are preferably connected to a sigma-delta modulator type of integrated circuit.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A torsion beam accelerometer sense element, comprising:

a substantially planar substrate;

a sensing member positioned above and parallel to said substrate and rotatable about a flexure axis, the portion of said sensing member on one side of said flexure axis being larger in area than the portion of said sensing member on the other side of said flexure axis;

first and second conductive surfaces arrayed substantially symmetrically on said substrate about said flexure axis, said second conductive surface coacting with said larger side of said sensing member to define a heavy side deflection capacitor, said first conductive surface coacting with said other side of said sensing member to define a light side deflection capacitor;

isolation means effective to limit the electrical geometry of said heavy side capacitor to substantially the physical geometry of said first conductive surface in at least one dimension;

wherein said sensing member rotates about said flexure axis responsive to acceleration normal to the surface of said substrate, and wherein the capacitance of said heavy side and light side capacitors change in response to said rotation.

2. The sense element of claim 1 wherein said sensing member comprises a planar semiconductive body having an opening along said flexure axis, said opening having therein a pedestal fixedly mounted to said substrate and a pair of opposed torsion arms connecting said pedestal to said planar semiconductive body, said torsion arms defining said flexure axis.

3. The sense element of claim 2 wherein said substrate is a dielectric substrate and wherein said first and second conductive surfaces comprise metallized portions of the surface of said substrate.

4. The sense element of claim 1 wherein said isolation means comprises a plurality of slots in said larger side of said sensing member, said slots defining a portion of said larger side of said sensing member substantially corresponding with said second conductive surface.

5. The sense element of claim 2 wherein said isolation means comprises a plurality of slots in said larger side of said sensing member, said slots defining a portion of said larger side of said sensing member substantially corresponding with said second conductive surface.

6. The sensor element of claim 3 wherein said isolation means comprises a plurality of slots in said larger side of said sensing member, said slots defining a portion of said larger side of said sensing member substantially corresponding with said second conductive surface.

7. The sense element of claim 2 wherein said planar semiconductive body, said pedestal, and said torsion arms are fabricated from a single wafer of single crystal silicon.

8. The sense element of claim 3 wherein said planar semiconductive body, said pedestal, and said torsion arms are fabricated from a single wafer of single crystal silicon.

9. The sense element of claim 5 wherein said planar semiconductive body, said pedestal, and said torsion arms are fabricated from a single wafer of single crystal silicon.

10. The sense element of claim 6 wherein said planar semiconductive body, said pedestal, and said torsion arms are fabricated from a single wafer of single crystal silicon.

11. The sense element of claim 8 wherein said pedestal is anodically bonded to said substrate.

12. The sense element of claim 9 wherein said pedestal is anodically bonded to said substrate.

13. A torsion beam accelerometer sense element, comprising:

a planar substrate;

a planar sensing member having at least a first internal opening;

mounting means positioned within said first internal opening for mounting said sensing member above said substrate, said mounting means comprising a pedestal having two opposed torsion arms defining a flexure axis about which said sensing member rotates responsive to acceleration normal to the plane of said substrate, said torsion arms fixed to said sensing member;

light side and heavy side plates of conductive material integral with said sensing member, said heavy side plate larger in area than said light side plate;

two pair of conductive plates defining heavy side and light side deflection capacitors, said heavy side deflection capacitor comprising said heavy side plate and a first conductive surface on said substrate below said heavy side plate, said light side deflection capacitor comprising said light side plate and a second conductive surface on said substrate below said light side plate, said light side and heavy side deflection capacitors arrayed substantially symmetrically on opposed sides of said flexure axis;

first and second slots in said heavy side plate extending proximately from said first internal opening and perpendicular to said flexure axis, inner longitudinal sides of said slots corresponding substantially to outer longitudinal edges of said conductive surface on said substrate below said heavy side plate, said slots extending a substantial portion of the length of said conductive surface on said substrate in the direction perpendicular to said flexure axis;

wherein said sensing member rotates about said flexure axis responsive to acceleration normal to the surface of said substrate, and wherein the capacitance of said heavy side and light side capacitors change in response to said rotation.

14. The sense element of claim 13 wherein said substrate is a dielectric substrate and said sensing member comprises a semiconductive body, wherein said first and second conductive surfaces on said substrate comprise metallized portions of rectilinear shape.

15. The sense of claim 13 wherein said slots extend to the outermost edge of said sensing member.

16. The sense of claim 14, wherein said slots extend to the outermost edge of said sensing member.

17. The sense element of claim 14 wherein said semiconductive body, said pedestal, and said torsion arms are fabricated from a single wafer of single crystal silicon.

18. The sense element of claim 17 wherein said dielectric substrate comprises glass, and wherein said pedestal is anodically bonded to said glass substrate.

19. The sense element of claim 13 wherein said sensing element further contains a plurality of through-holes sufficient to alter the damping coefficient of said sense element.

20. A torsion beam accelerometer sense element, comprising:

a planar dielectric glass substrate;

a planar semiconductive sensing member having at least a first internal opening;

mounting means positioned within said first internal opening for mounting said sensing member above said substrate, said mounting means comprising a pedestal having two opposed torsion arms defining a flexure axis about which said sensing member rotates responsive to acceleration normal to the plane of said substrate, said torsion arms fixed to said sensing member;

light side and heavy side plates of conductive material integral with said sensing member, said heavy side plate larger in area than said light side plate;

two pair of conductive plates defining heavy side and light side deflection capacitors, said heavy side deflection capacitor comprising said heavy side plate and a conductive surface on said substrate below said heavy side plate, said light side deflection capacitor comprising said light side plate and a conductive surface on said substrate below said light side plate, said light side and heavy side deflection capacitors arrayed substantially symmetrically on opposed sides of said flexure axis;

first and second slots in said heavy side plate extending proximately from said internal opening and perpendicular to said flexure axis, inner longitudinal sides of said slots corresponding substantially to outer longitudinal edges of said conductive surface on said substrate below said heavy side plate, said slots extending a substantial portion of the length of said conductive surface on said substrate in the direction perpendicular to said flexure axis;

a pair of self-test conductive electrodes arrayed on either side of said conductive surface on said substrate below said heavy side plate, said self-test conductive electrodes together with said heavy side plate of said sensing member defining self-test capacitors causing said sensing member to rotate about said flexure axis when said heavy side plate and said self-test conductive electrodes do not have the same electrical potential;

wherein said sensing member rotates about said flexure axis responsive to acceleration normal to the surface of said substrate, and wherein the capacitance of said heavy side and light side capacitors change in response to said rotation.

* * * * *